USU010909571B2

(12) United States Patent
Koh et al.

(10) Patent No.: US 10,909,571 B2
(45) Date of Patent: Feb. 2, 2021

(54) VISITOR IDENTIFICATION BASED ON FEATURE SELECTION

(71) Applicant: Adobe Inc., San Jose, CA (US)

(72) Inventors: Eunyee Koh, San Jose, CA (US); Rhema P. Linder, College Station, TX (US)

(73) Assignee: Adobe Inc., San Jose, CA (US)

( * ) Notice: Subject to any disclaimer, the term of this patent is extended or adjusted under 35 U.S.C. 154(b) by 1070 days.

(21) Appl. No.: 14/823,121

(22) Filed: Aug. 11, 2015

(65) Prior Publication Data

US 2017/0046735 A1 Feb. 16, 2017

(51) Int. Cl.
*G06Q 30/02* (2012.01)

(52) U.S. Cl.
CPC ..... *G06Q 30/0254* (2013.01); *G06Q 30/0269* (2013.01)

(58) Field of Classification Search
CPC .................. G06Q 30/0254; G06Q 30/0269
USPC .......................................... 705/14.52, 14.53
See application file for complete search history.

(56) References Cited

U.S. PATENT DOCUMENTS

| 7,251,687 | B1 | 7/2007 | McCullough | |
|---|---|---|---|---|
| 2008/0183745 | A1* | 7/2008 | Cancel | G06Q 30/02 |
| 2014/0136321 | A1* | 5/2014 | Bolan | G06Q 30/0269 705/14.53 |
| 2016/0300144 | A1* | 10/2016 | Santhanam | G06Q 30/0631 |

FOREIGN PATENT DOCUMENTS

KR 20110034175 A * 4/2011

OTHER PUBLICATIONS

Michel Bruley, Web log & clickstream, 2014 (Year: 2014).*
"Combined Search and Examination Report", GB Application No. 1610166.9, dated Nov. 28, 2016, 9 pages.
"About Universal Analytics", Retrieved at: https://support.google.com/analytics/answer/2790010, on Jun. 11, 2015, 2014, 3 pages.

(Continued)

*Primary Examiner* — Tarek Elchanti
(74) *Attorney, Agent, or Firm* — SBMC (57) ABSTRACT

Techniques are described in which a service operates to identify consumers corresponding to visitor interactions with resources available from a service provider. Features are selected to use for matching of clickstream data collected for unknown visitors to profiles established for known visitor IDs. The features are selected based on analysis that accounts for consistency, completeness, and uniqueness of features among a corpus of profiles. Then, relevance scores are computed over the selected features using an information retrieval model in which clickstreams are treated as queries and profiles are treated as documents. Unknown visitors are matched to corresponding profiles using the relevance scores. Access to the digital media content is then controlled in accordance with the matching based on relevance scores, such as by serving individualized marketing offers and content to consumers that is targeted to characteristics of the consumers indicated by respective profiles.

20 Claims, 6 Drawing Sheets

(56) References Cited

OTHER PUBLICATIONS

Kaswar, "Home Computing Unplugged: Why, Where and When People Use Different Connected Devices at Home", in Proceedings of the 2013 ACM International Joint Conference on Pervasive and Ubiquitous Computing, 2013, 10 pages.

Wang, "Characterizing and Supporting Cross-Device Search Tasks", In Proceedings of the Sixth ACM International Conference on Web Search and Data Mining, ser. WSDM, 2013, 10 pages.

"Foreign Office Action", GB Application No. 1610166.9, dated Nov. 12, 2018, 9 pages.

"Foreign Office Action", GB Application No. 1610166.9, dated Jun. 20, 2019, 8 pages.

* cited by examiner

302
Select features to use for matching of clickstream data collected for unknown visitors to profiles established for known visitor identifiers (IDs), the features selected based on feature selection analysis that accounts for completeness, consistency, completeness, and uniqueness of features among a corpus of profiles established for the known visitor IDs

304
Match unknown visitors to the profiles established for known visitor IDs based on relevance scores of the clickstream data for the unknown visitors relative to the profiles, the relevance scores computed over the selected features using an information retrieval model

306
Control access of consumers to digital media content in accordance with the matching based on relevance scores

308
Make content recommendations

310
Distribute marketing offers

312
Serve advertisements

314
Individualize digital media content

VISITOR IDENTIFICATION BASED ON FEATURE SELECTION

BACKGROUND

As consumer interaction with online resources (e.g., use of web resources, e-commerce, browsing activity, web applications, website visits, etc.) has grown digital marketing too has becoming increasingly more common. Generally, digital marketers seek to deliver offers for products, services, and content to consumers who will find the offers favorable and have a high probability of responding to the offers. Accordingly, one challenge faced by digital marketers is matching of offers to users so as to maximize the likelihood that users will accept the offers and accordingly optimize the return/reward to the digital marketers derived from the offers. Generally, marketing schemes are derived to target content to consumers having characteristics that are associated with the content. The characteristics of individual users can be gleaned by collection and analysis of clickstream data (e.g., logging of page requests, selections, clicks, navigation actions, and the like) corresponding to interaction with digital media content. In this context, visitor identification techniques involve associating clickstream data derived from web traffic with individual users.

Associating clickstream data correctly with accounts and/or user IDs of users is challenging, particularly in scenarios in which the users interact without being logged-in and use multiple different devices. Traditionally, tracking cookies are employed by service providers as a mechanism to identify and distinguish between different visitors who use online resources, as well as to distinguish between human and machine traffic. However, tracking cookies change over time, can be deleted or disabled, and are different for multiple different devices that a particular user may employ. Consequently, techniques that rely on tracking cookies can create separate clickstreams for a particular user that should be combined, but instead are associated with different cookies/IDs. Traditional tracking cookie based techniques provide no way to link the separate clickstreams and therefore are limited with respect to connection of related clickstreams across devices and time. As a result, tracking data used to analysis and make marketing decisions is incomplete, which can adversely impact digital marketing objectives, such as for revenue, satisfaction, offer acceptance, and so forth.

SUMMARY

Techniques to associate clickstream data collected for unknown visitors with known visitors are described herein. In one or more implementations, a digital marketing environment includes a service that operates to identify consumers corresponding to visitor interactions with resources available from a service provider. To do so, features are selected to use for matching of clickstream data collected for unknown visitors to profiles (e.g., clickstream histories for multiple interactions) established for known visitor identifiers (IDs). The features are selected based on feature selection analysis that accounts for completeness, consistency, and uniqueness of features among a corpus of profiles. Then, relevance scores are computed over the selected features using an information retrieval model in which clickstreams are treated as queries and profiles are treated as documents. Unknown visitors are matched to the profiles established for known visitor IDs based on the relevance scores. Access of the consumers to the digital media content can then be controlled in accordance with the matching, such as by serving individualized marketing offers and content to consumers that is targeted to characteristics of the consumers indicated by respective profiles.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Visitor identification techniques that rely on tracking cookies can create separate clickstreams for a particular user that should be combined, but instead are associated with different cookies/IDs. Traditional tracking cookie based techniques provide no way to link the separate clickstreams, and therefore are limited with respect to connection of related clickstreams across devices and time. As a result, tracking data used to analysis and make marketing decisions is incomplete, which can adversely impact digital marketing objectives, such as for revenue, satisfaction, offer acceptance, and so forth.

Visitor identification techniques to associate clickstream data collected for unknown visitors with known visitors are described herein. In one or more implementations, a digital marketing environment includes a service that operates to identify consumers corresponding to visitor interactions with resource available from a service provider using an information retrieval model. To do so, features are selected to use for matching of clickstream data collected for unknown visitors to profiles (e.g., clickstream histories for multiple interactions) established for known visitor identifiers (IDs). The features correspond to attributes of web traffic such as time and date fields, device ID, browser type, user identifiers, device settings, language, user agent string, IP address, cookie ID, and location to name some examples. The features are selected based on feature selection analysis that accounts for completeness, consistency, and uniqueness of features among a corpus of profiles. In one approach, factors for completeness, consistency, and uniqueness are combined to score features with respect to how predictive the features are for visitor identification purposes. A complete feature is one that occurs in each data instance of an individual profile, a consistent feature has the same value for each instance, and a unique feature does not occur in any other profile. A unique identifier (e.g., GUID) is an example of an ideal feature that perfectly meets these properties. Scores for other features measure extents to which the features exhibit the ideal properties, and therefore how predictive the features are relative to one another. Adjustable weights can also be associated with the factors to enable tuning of the influence of different factors on the scores. Based on the scoring, a designated number of the top scoring features (e.g., the most predictive features) are selected to use for visitor identification analysis.

When live clickstream data is subsequently obtained in connection with digital media content interactions, relevance scores are computed over the features selected through feature selection analysis using an information retrieval model in which clickstreams are treated as queries and profiles are treated as documents. Thus, computing the relevance scores involves transforming clickstream data into queries and scoring the relevance of existing profiles (e.g., documents) against individual profiles. In one approach, the relevance scores are computed as a sum over the selected features of factors indicative of uniqueness and frequency of the selected features relative to the individual profiles.

Unknown visitors are matched to the profiles established for known visitor IDs based on the relevance scores. For example, clickstream data for an interaction can be merged with a top ranking profile as long as a threshold relevance score is achieved. The threshold relevance score ensures that sufficient closeness between the data and profile exists before the data is combined with the profile. When a threshold relevance score is not achieved, a new profile is created for the clickstream data corresponding to the unknown visitor. Access of the consumers to digital media content can then be controlled in accordance with the matching based on relevance scores, such as by serving individualized marketing offers and content to consumers that is targeted to characteristics of the consumers indicated by respective profiles.

In this manner, relationships between separate clickstreams can be identified and used to merge data into profiles for known user IDs. By doing so, instances of unmatched clickstreams data are reduced and the completeness and accuracy of data included in profiles for known user IDs is increased. This in turn enables more efficient and effective marketing decision analysis, which increases the likelihood that users will be satisfied with targeted content or offers provided based the marketing decision analysis. Additionally, the likelihood that objectives of the digital marketer will be achieved is also increased.

In the following discussion, an example environment is first described that may implement the techniques described herein. Example details regarding the techniques are then discussed in relation to some example scenarios, diagrams, and procedures. Lastly, an example system and components of the system are discussed that may be employed to implement various techniques described herein.

Example Environment

Figure 1:
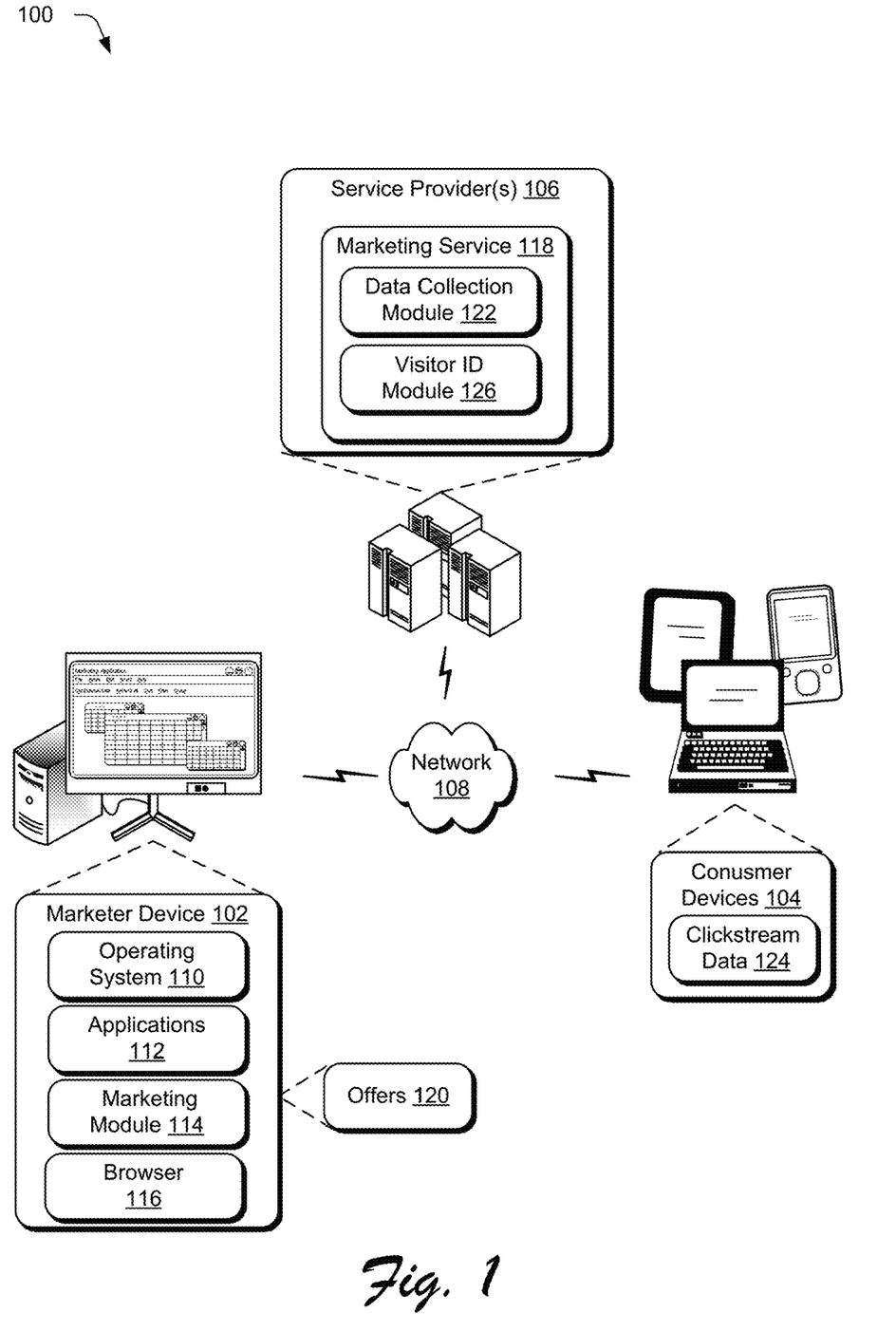
FIG. 1 is an illustration of an example operating environment that is operable to employ techniques for visitor identification based on feature selection.

FIG. 1 is an illustration of an environment 100 in an example implementation that is operable to employ techniques described herein. The illustrated environment 100 includes a marketer device 102, one or more consumer devices 104, and a service provider 106 that are communicatively coupled via a network 108. The marketer device 102, consumer devices 104, and service provider 106 may each be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 6.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The marketer device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, provides data to the operating system 110 to be rendered and displayed by a display device as illustrated without understanding how this rendering will be performed. A variety of applications 112 typically associated with devices are contemplated including, but not limited to, a document reader, a multi-media player, image editing software, a productivity suite that integrates multiple office productivity modules, games, and so forth. As specific example of applications 112, the marketer device 102 is also illustrated as including a marketing module 114 and a browser 116.

The marketing module 114 is configured in various ways to implement techniques for personalized marketing. As illustrated, the marketing module 114 may be provided as a standalone application that enables digital marketers to manage marketing campaigns, audience data, market segments, and so forth. In general, this includes marketing data collection, analysis of data to ascertain market segments of consumers having selected traits, creation of offers for products, services, and/or content, and distribution of the offers. The marketing module 114 also facilitates interaction with a marketing service 118 provided by the service provider 106 over the network. Thus, the marketing module 114 may represent a thin client web-based application or a web-enabled desktop application through which a digital marketer accesses a marketing account with the marketing service 118 and interact with corresponding data. In addition or alternatively, the techniques described herein may be implemented by way of the browser 116 configured to access the marketing service 118 over the network 108. Functionality of the marketing module 114 may also be integrated with the marketing service 118.

As noted, the service provider 106 provides a marketing service 118 as depicted in FIG. 1. The marketing service 118 implements an integrated digital marketing environment configured to provide a suite of digital marketing tools including but not limited to consumer data collection and analytics, social media management, digital advertising, audience targeting, and/or web experience management, to name a few examples. The marketing service 118 also enables generation of offers 120 that may be provided to consumers via consumer devices 104. The digital marketing environment also operates to individualize marketing actions taken with respect to different consumers as described in this document.

Offers 120 may include but are not limited to advertisements, links to other targeted resources (services and content), individualized digital media content, digital coupons, informative (e.g., on-sale) offers, and promotional offers, to name a few examples. Offers 120 are provided via a plurality of different marketing channels, such as social networking, display ads, email, voicemail, instant messaging, marketing calls, and other types of interaction. Various digital marketing tools are made accessible via webpages or other user interfaces that are accessed and rendered by a marketing device 102. The marketing service 118 may be implemented in the "cloud" as a service accessible over the network as illustrated, by one or more distributed components in a client-server environment, as a locally deployed enterprise platform, and/or in another suitable manner.

In accordance with techniques described above and below, the marketing service 118 includes or otherwise makes use of a data collection module 122 that is configured to obtain and manipulate clickstream data 124 from the consumer devices 104. In particular, the data collection module 122 represents functionality operable to collect, access, and/or make use of clickstream data 124 that is indicative of online consumer interaction with digital media content. Generally, clickstream data 124 includes user characteristics (e.g., age, sex, location, affiliations, IP address, cookie ID, user ID, etc.) and behaviors (e.g., browsing habits, favorites, purchase history, device settings, preferences, account activity, page views, offer views, etc.) from the various consumers. The data collection module 122 collects and stores clickstream data 124 on behalf of digital marketers. For example, clickstream data 124 may be collected based on visits to a website, interactions with a web application, as part of e-commerce transactions, based on account sign-ups, and so forth. As discussed in greater detail below, the data collection module 122 can organize clickstream data 124 into profiles for different users/consumers that reflect clickstream histories for multiple interactions. Profiles can be used to match offers to consumers based on characteristics and attributes of the consumers indicated by respective profiles.

Profiles can be associated with known user identifiers, such as globally unique identifiers (GUIDs) assigned to user accounts supported by the service. For clickstreams that are collected for unknown visitors not yet associated with an account, profiles can be created and assigned a system generated identifier on a temporary basis. Such identifiers are referred to herein as "soft" GUIDs or SGUID. Techniques discussed herein are designed to find matches between data associated with SGUID (e g, unmatched data) and profiles with known GUIDs. When a matching profile is discovered, the unmatched data is merged into the profile for the known GUID, and the SGUID can be discarded or released. On the other hand, if sufficient interaction associated with a SGUID is observed to indicate that the unknown user is in fact a new user, the profile for the SGUID is converted into and/or treated as known user profile.

In addition to collection of clickstream data, the marketing service 118 is configured to utilize data in various ways to inform digital marketers regarding user activities and facilitate creation of effective marketing strategies and campaigns. One example of such analysis involves techniques for visitor identification based on feature selection described in this document. For example, the marketing service 118 includes or otherwise makes use of a visitor identification module 126 that represents functionality operable to analyze, manage, and manipulate clickstream data 124 in various ways described above and below. By way of example and not limitation, the visitor identification module 126 includes functionality to implement feature selection analysis that accounts for completeness, consistency, and uniqueness of features among a corpus of profiles. Additionally, the visitor identification module 126 can implement profile matching functionality to match live clickstream data to existing profiles using an information retrieval model. In the information retrieval model, the clickstream data is transformed into query parameters that are used to search through a corpus of profiles to assess relevance of the profiles to the clickstream data. Examples and details regarding these and other aspects are discussed in relation to the following figures.

Having considered an example environment, consider now a discussion of some example details of techniques for visitor identification based on feature selection in accordance with one or more implementations.

Visitor Identification based on Feature Selection Details

Example Marketing Service

Figure 2:
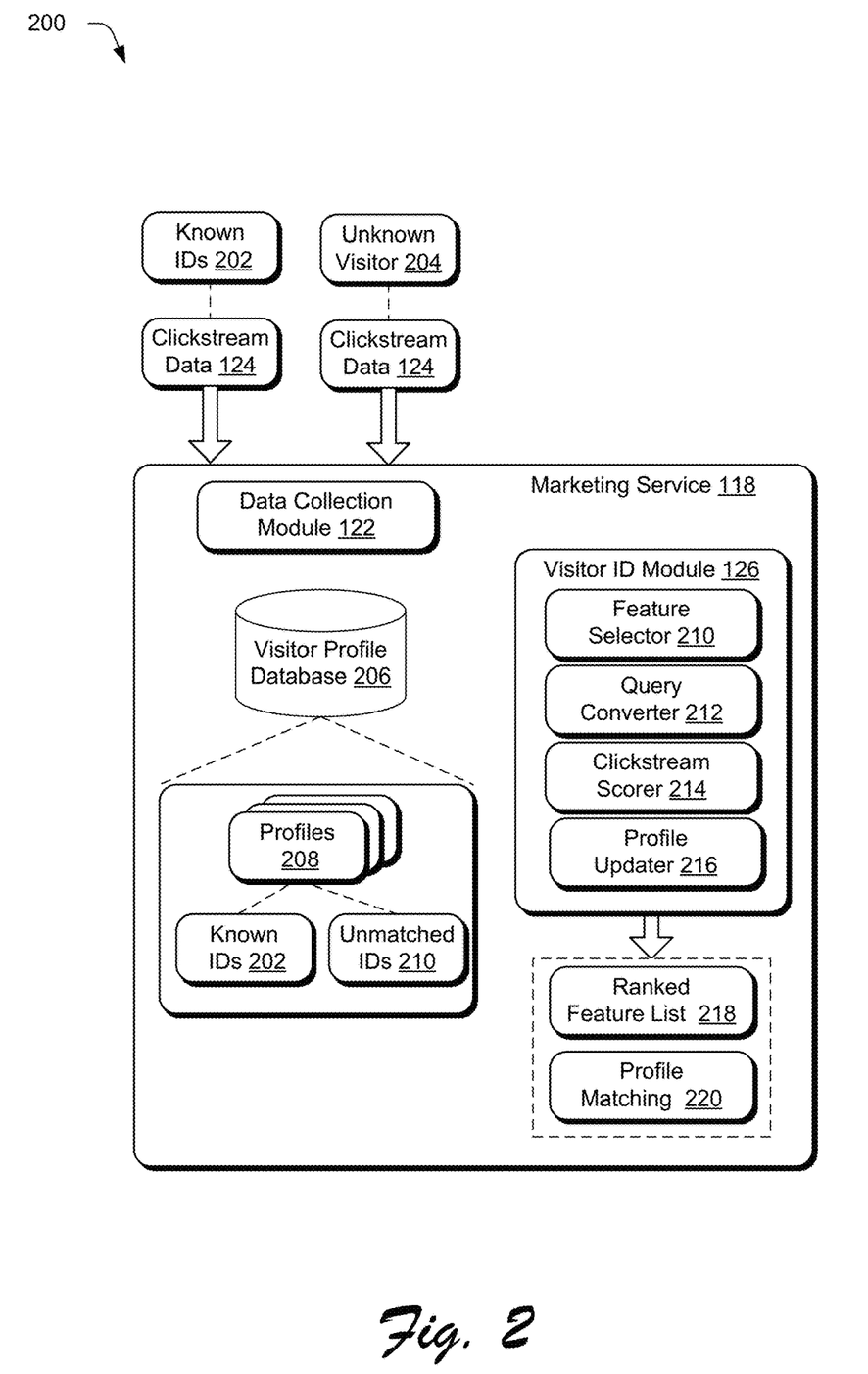
FIG. 2 is a diagram depicting example details and components of a marketing service in accordance with one or more implementations.

To further illustrate details of the example techniques, consider now FIG. 2 which depicts generally at 200 a diagram that represents details and components of an example marketing service 118 as described in relation to FIG. 1 that implements a data collection module 122 operable to collect clickstream data 124 and a visitor identification module 126 operable to analyze, manage, and manipulate clickstream data 124 in various ways.

The data collection module 122 can use various techniques to obtain clickstream data 124 related to interactions of consumers with online resources such as digital media content, web pages, web applications, web sites, and so forth. For example, tracking data collected at a client by a browser or other application can be communicated to the marketing service 118 via client-server exchanges during a communication session. Clickstream data 124 can be conveyed via digital cookies, as structured data messages, though message metadata, or via other suitable data objects and messages. As represented in FIG. 2, data collection module 122 collects clickstream data 124 from both consumers associated with known identifiers 202 and unknown visitors 204. Generally, the known identifiers 202 corresponding to user accounts with a service provider 106 that provides the marketing service or an affiliate provider. Clickstream data 124 associated with known identifiers 202 is obtained when users are logged-in to an account recognizable by the service. Unknown visitors 204 correspond to interaction that occurs without being logged-in to an account. As such, clickstream data 124 collected for unknown visitors 204 cannot be immediately associated with a known known identifiers 202.

Visitor identification techniques described in this document, though, provide mechanisms to analyze clickstream data 124 collected for unknown visitors 204 and either merge the data into a matching profile/known ID when a match is found, or create a new profile with an unmatched ID assigned by the system when it is determined that an unknown visitor is a new user. For example, the data collection module 122 can provide collected data for use by the visitor identification module 126, which performs analysis to identify consumers corresponding to interactions with resources as described herein. Based on this analysis, profiles which reflect clickstream histories for distinct consumers (e.g., data records collected across multiple interactions per account/ID) can be established and managed by the marketing service 118.

In particular, the example marketing service 118 additionally includes a visitor profile database 206 in which profiles 208 established for consumers are maintained. The profile database 206 can organize profiles 208 using inverted indexes keyed by feature values. For instance, the inverted indexes are configured to map feature values to profiles containing the values to facilitate fast searching. As represented, the profiles include profiles for known identifiers 202 and profiles associated with unmatched identifiers 210 that are assigned by the system. The profiles 208 are used to implement techniques for visitor identification described herein. For example, profiles for known identifiers 202 can be utilized as part of feature selection analysis to rank features according to predictability and select features to use as part of analysis to match live clickstream data to relevant profiles. In accordance with an information retrieval model, profiles 208 are also employed as corpus of "documents" that are searched over the features selected through feature selection analysis to assess relevance to a "query" in the form of clickstream data for an unknown visitor 204.

Thus, the visitor identification module 126 broadly speaking represents functionality to implement both feature selection analysis and profile matching of data to profiles using an information retrieval model. To provide such functionality, the visitor identification module 126 may include or other make use of various sub-components as represented in FIG. 2. In particular, example sub-components represented in FIG. 2 include a feature selector 210, a query converter 212, a clickstream scorer 214, and a profile updater 216. The feature selector 210 represents functionality associated with performing feature selection analysis to find the most predictive features. The feature selector 210 is designed to output a ranked feature list 218 that can be used as a basis for subsequent analysis to match clickstream data for unknown visitors to known IDs.

Together, the query converter 212, clickstream scorer 214, and profile updater 216 represents functionality associated with profile matching to find existing profiles that corresponding to unmatched clickstream data and, when appropriate, merge unmatched clickstream data into existing profiles. As part of profile matching, the query converter 212 is configured to transform clickstream data into queries for selected features. This may involve extracting feature values from clickstream data and constructing a query string with the values. The query converter 212 can also be configured to set different weights among the different features. Thus, queries can be generated and tuned by assigning different weights to control influence of the features on the overall relevance score. The weights provide flexibility to adapt the system to different scenarios and to accommodate different objectives.

The clickstream scorer 214 is configured to compute relevance scores of clickstream data 214 for the unknown visitors 204 relative to the profiles 208. In particular, clickstream scorer 214 implements an information retrieval model to compute relevance scores computed over the selected features by searching through a corpus of profiles 208 (e.g., the visitor profile database 206) to score and rank relevance of individual profiles to a query derived from corresponding clickstream data by the query converter 212.

The profile updater 216 operate to update profiles 208 in the visitor profile database 206 based on the scores and ranking by the clickstream scorer 214. In an implementation, the profile updater 216 implements and enforces a relevance score threshold as described previously. The threshold relevance score ensures that sufficient closeness between the data and a profile exists before the data is combined with the profile. The relevance score threshold can be a pre-defined value that is set by the developer. In addition or alternatively, the relevance score threshold may be adjustable to provide tunable control over the scoring. Thus, the profile updater 216 can merge clickstream data with a top ranking profile as long as a threshold relevance score is achieved. When a threshold relevance score is not achieved, a new profile is created for the clickstream data corresponding to the unknown visitor 202. Further details regarding these and other aspects of visitor identification techniques are discussed in relation to the following example procedures.

Example Procedures

The following discussion describes example procedures that may be implemented utilizing the previously described systems and devices. The procedures represent example techniques to identify visitors, and based on the identification, individualize marketing actions taken with respect to different visitors within a digital marketing environment. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the environment 100 of FIG. 1 and the example components of FIG. 2. In at least some embodiments, the procedures may be performed by a suitably configured computing device(s), such as one or more server devices associated with the service provider 106 that implements a marketing service 118, and/or a marketer device 102 of FIG. 1 that includes a suitable marketing module 114 or browser 116 to implement the described techniques.

Visitor Identification for Content Control

Figure 3:
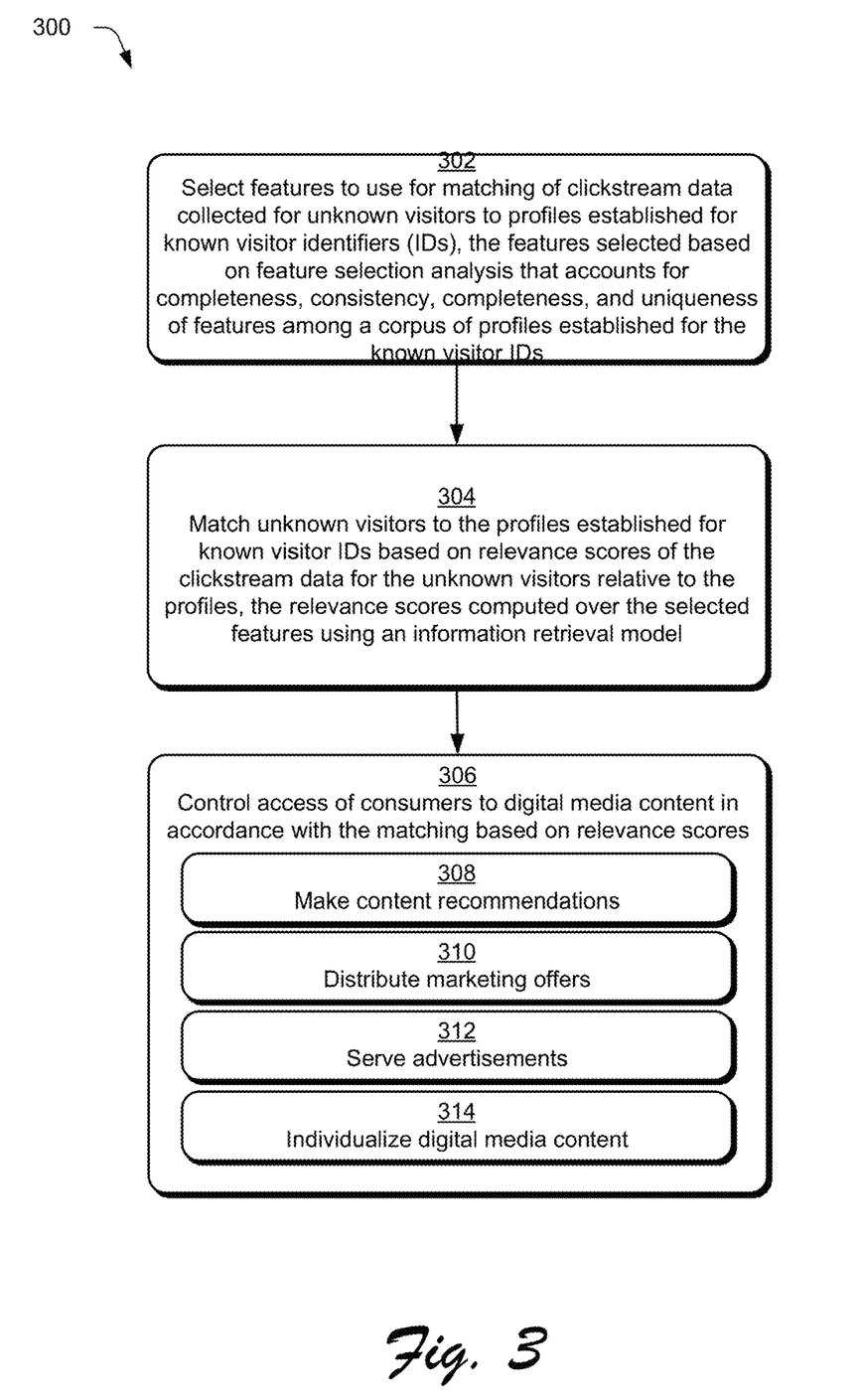
FIG. 3 is a flow diagram depicting an example procedure in which access to digital media content is controlled using characteristics indicated by profiles established using visitor identification based on feature selection in accordance with one or more implementations.

FIG. 3 is a flow diagram depicting an example procedure 300 in which access to digital media content is controlled using characteristics indicated by profiles established through visitor identification based on feature selection. The procedure 300 represents a combination of feature selection and profile matching as described in the document, which can be used as a basis for making marketing decisions and controlling access to content.

Features are selected to use for matching of clickstream data collected for unknown visitors to profiles established for known visitor identifiers (IDs). The features can be selected based on feature selection analysis that accounts for completeness, consistency, and uniqueness of features among a corpus of profiles established for the known visitor IDs (block 302). For example, a marketing service 118 can perform feature selection analysis as part of visitor identification as described previously. A goal of feature selection is to rank different features associated with clickstream data according to how predictive the features are in assessing relevance of clickstream data to existing profiles. As noted, the features correspond to attributes of web traffic such as time and date fields, device ID, browser type, user identifiers, device settings, language, user agent string, IP address, cookie ID, and location to name some examples. Feature selection analysis can produce a ranked feature list 218 that orders different features according to predictability. A configurable number of top predictive features can then be utilized as part of subsequent profile matching. By way of example and not limitation, the top 10, 50 or 100 features may be selected depending upon the particular usage scenario. Details regarding example techniques for feature selection that can be used in conjunction with example procedure 300 or otherwise are discussed below in relation to the example procedure of FIG. 4.

Unknown visitors are matched to the profiles established for known visitor IDs based on relevance scores of the clickstream data for the unknown visitors relative to the profiles. The relevance scores are computed over the selected features using an information retrieval model (block 304). For example, a marketing service 118 can perform profile matching 220 as part of visitor identification as described previously. Generally speaking, the profile matching involves computing relevance scores of existing profiles with respect to clickstream data for unknown visitors and using the scores to update profiles 208 accordingly. In one or more implementations, profile matching is conducted using an information retrieval model in which clickstream data 124 is treated as queries and profiles 208 are treated as documents that are searched based on feature values specified by the queries. The profile matching is configured to use the predictive features that are selected in accordance with feature selection analysis. Details regarding example techniques for profile matching are discussed below in relation to the example procedure of FIG. 5.

Access of consumers to digital media content is controlled in accordance with the matching based on relevance scores (block 306). For instance, the marketing service 118 can initiate one or more marketing actions to communicate digital media content to consumers (or otherwise enable/initiate consumer access to the digital media content) that is targeted to the consumers based in part upon profiles that are established using visitor identification techniques described herein. Marketing actions can be taken directly by the marketing service 118 to control access to content available via a corresponding service provider 106 and/or to control access to content on behalf of marketers. In addition or alternatively, profiles and other relevant data can be exposed or supplied for use by marketers to inform marketing decisions. Various actions to control access to content are contemplated. By way of example and not limitation, example actions represented in FIG. 3 include making content recommendations 308, distributing marketing offers 310, serving advertisements 312, and individualizing digital media content 314. The recommendations, offers, advertisements, and digital media content is selected and configured according to characteristics of targeted consumers as indicated by corresponding profiles 208.

In an example, the marketing service 118 sends a control message or other suitable communication to initiate performance of the actions by a marketer, such as by way of a corresponding marketer device 102 that includes or makes use of a marketing module 114. The control message is configured to indicate the one or more marketing actions identified by the service and is also effective to cause performance of one or more marketing actions by a marketer device 102 to provide targeted marketing offers to the individual consumers. Performance of the one or more marketing actions involves interactions between the marketer/marketing service and the target consumers to provide offers 120 identified from the analysis.

Feature Selection

Figure 4:
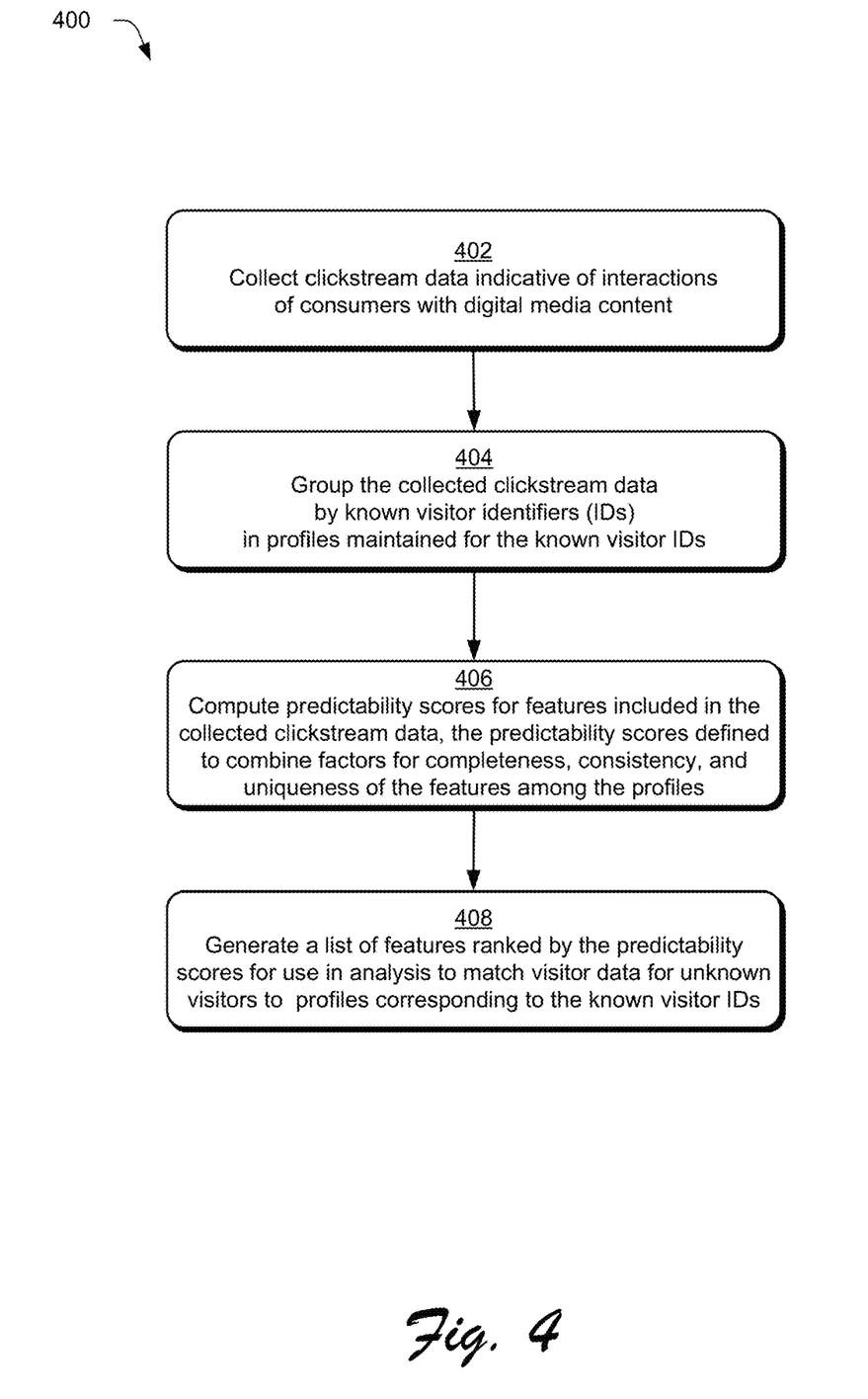
FIG. 4 is a flow diagram depicting an example procedure in which a features to use for profile matching are selected in accordance with one or more implementations.

FIG. 4 is a flow diagram depicting an example procedure 400 in which a features to use for profile matching are selected in accordance with one or more implementations. The feature selection involves scoring of features according to predictability as noted previously. Scoring can be performed by way of a marketing service 118 via a visitor identification module 126 that implements a feature selector 210, or other comparable functionality. The result of feature selection is a ranked feature list 218 that ranks features by predictability.

To do so, clickstream data indicative of interactions of consumers with digital media content is collected (block 402) and the collected clickstream data is grouped by known visitor identifiers (IDs) in profiles maintained for the known visitor IDs (block 404). This process establishes a database of profiles 208 associated with known IDs 202 that provides a corpus of historical clickstream data used to assess predictability of different features.

Predictability scores are computed for features included in the collected clickstream data. The predictability scores are defined to combine factors for completeness, consistency, and uniqueness of the features among the profiles (block 406). Various different mathematical combinations of factors for completeness, consistency, and uniqueness are contemplated. For example, values for the factors can be multiplied or added together to give an overall prediction score. In one approach, adjustable weights can also be associated with the factors to enable tuning of the influence of different factors on the scores. Details regarding computations for completeness, consistency, and uniqueness are discussed in turn just below.

As noted, feature selection uses a sample of clickstream data from profiles where known IDs are included. Each hit (page view or action) in a clickstream contains a set of attributes or features F. The features indicate characteristics and behaviors of users/devices such as cookie ID, IP address, user agent string, browser type, etc. In practice, clickstream data can include hundreds of different features. Feature selection is designed to ascertain the most predictive features and thereby create an effective matching algorithm. Specifically, feature selection results in an ordered list of features F ranked from most to least predictive for visitor identification.

In this context, consider a set of profiles P, where $p \in P$ profiles each have a set of hits: $h \in p$. The $h \in p$ set of all hits is denoted by H. Each hit h has a value, which may be empty, for all features $f \in F$. This value is h[f]. A predictive scoring algorithm is defined to compute and combine factors that indicated completeness, consistency, and uniqueness of features f among the corpus of profiles P.

By way of example, a PredictScore value for each feature for a given corpus can be defined as follows:

$$\text{PredictScore}(f,P) = \text{complete}(f,P) * \text{consistent}(f,P) \\ * \text{unique}(f,P)$$

In this approach, PredictScore is based on three analysis of a feature f among the corpus of profiles P. For the purpose of profile matching an ideal feature has properties of being complete, consistent, and unique. A complete feature is one that occurs in each data instance (e.g., hit) of an individual profile, a consistent feature has the same value for each instance, and unique feature does not occur in any other profile. A unique identifier (e.g., GUID) is an example of an ideal feature that perfectly meets these three properties. Scores for other features measure the extent to which the features are ideal (e.g., extents of completeness, consistency, and uniqueness and therefore how predictive the features are relative to one another. The properties can be expressed as follows:

completeness: $h[f] \neq$ for all $h \in H$, where Rank=1.
consistency: Each $h[f]$ has the same value for each hit in a profile: for all $p \in P$, $h_i[f] = h_j[f]$ where $h_i, h_j \in p$.
uniqueness: for each profile, $h_f \in p$ is a value that does not occur in any other profile.

The factors that correspond to these properties and are used in the PredictScore calculation are defined and computed as follows:

Completeness is the number of non-empty hits where the feature f is not empty divided by the total number of hits.

$$\text{complete}(f, P) = \frac{|h[f] \neq \emptyset, h \in H|}{|H|}$$

Consistency is the purity of $h_f$ values of each p averaged over all profiles. Essentially, it averages the most frequently occurring value $h_f$ of a profile's hits. If a profile had 10 hits, with one value for a feature occurring 5 times, the value would be 0.5 for that profile.

$$\text{consistent}(f, P) = \frac{1}{|P|} \sum_{p \in P} \frac{1}{|P|} \max|k = [f]|, h \in p,$$

where k is a single value

Uniqueness is a measure of the number of different values for h[f] of among H divided by the number of profiles.

$$\text{unique}(f, P) = \frac{1}{|P|} \sum_{h_f \in p \forall P} |h[f] \text{ is distinct among } P|$$

Based on the scoring, a designated number of the top scoring features (e.g., the most predictive features) are selected to use for visitor identification analysis. In particular, a list of features ranked by the predictability scores is generated for use in analysis to match visitor data for unknown visitors to profiles corresponding to the known visitor IDs (block 408). The system is configured to employ a designated number of the most predictive features for subsequent profile matching, details of which are discussed in relation to the following example procedure. Accordingly, once a corpus of profiles P is constructed, calculating PredictScore(f,P) for each feature yields a sorted list of the most predictive features. Choosing a designated top number of features allows the developer/user to trade off accuracy with space and speed constraints.

Profile Matching

Figure 5:
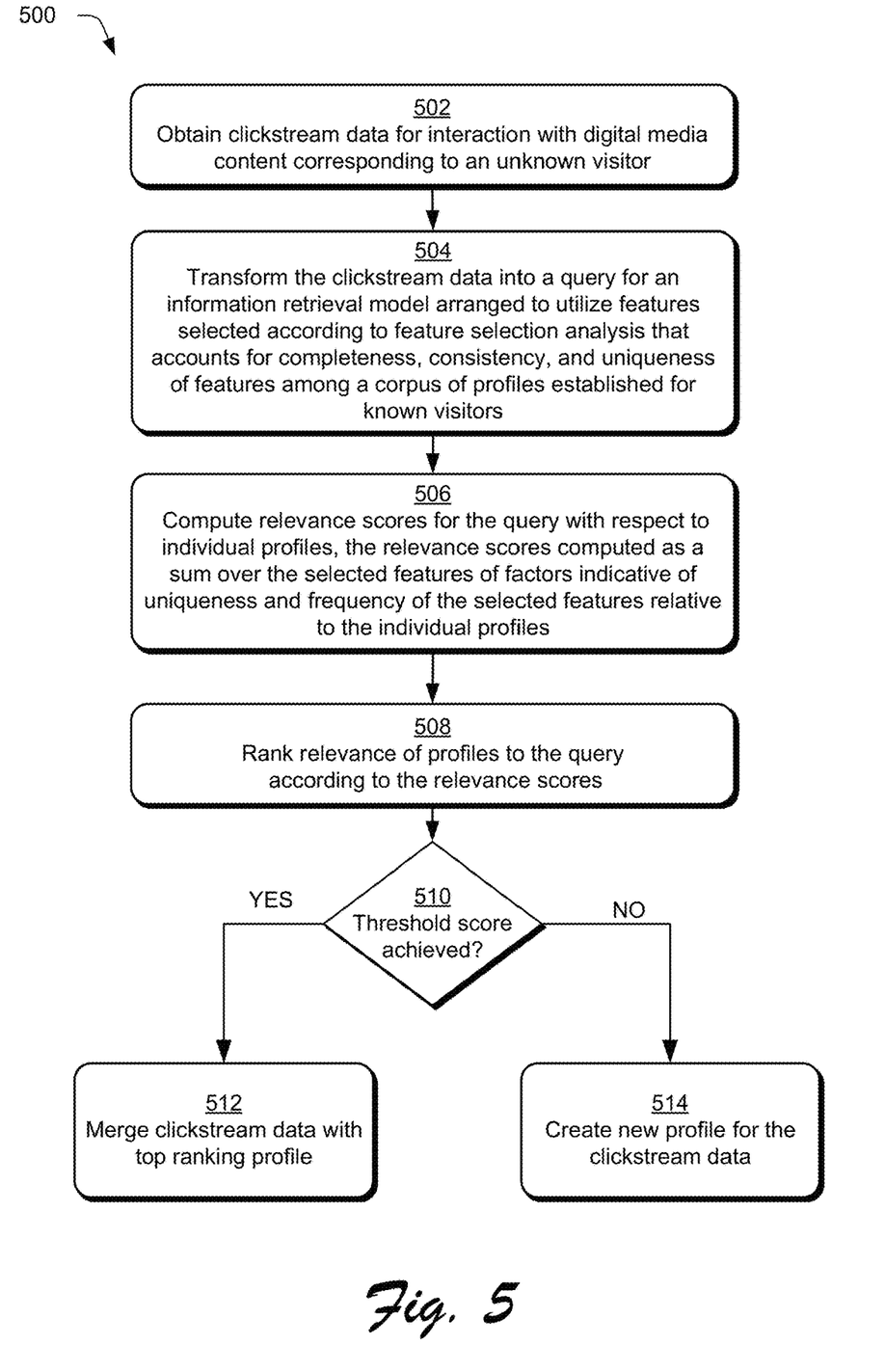
FIG. 5 is a flow diagram depicting an example procedure in which profile matching occurs using features that are selected through feature selection analysis in accordance with one or more implementations.

FIG. 5 is a flow diagram depicting an example procedure 500 in which profile matching occurs using features that are selected through feature selection analysis in accordance with one or more implementations. Profile matching involves computing relevance scores of existing profiles with respect to clickstream data for unknown visitors and using the scores to update profiles 208 accordingly. In one or more implementations, profile matching is conducted using an information retrieval model as discussed herein. Profile matching can be performed by way of a marketing service 118 that includes or makes use of a visitor identification module 126, or comparable functionality.

Clickstream data is obtained for interaction with digital media content corresponding to an unknown visitor (block 502). For instance, a marketing service 118 can implement a data collection module 122 that operates to collect clickstream data 124 in the manner previously described. This can include live data that corresponds to unknown visitors.

When data for unknown visitors is collected, the clickstream data is transformed into a query for an information retrieval model arranged to utilize features selected according to feature selection analysis that accounts for completeness, consistency, and uniqueness of features among a corpus of profiles established for known visitors (block 504). For instance, features used for profile matching can be determined based on feature selection analysis as discussed in relation to example procedure 400 of FIG. 4 and elsewhere herein. Further, the profile matching can be implemented via an information retrieval model as described above and below. Query transformation can occur via a query converter 212 as discussed previously or equivalent functionality. Transforming clickstream data occurs by extracting feature values for selected feature and generating a corresponding query string that is suitable to search a corpus of profiles.

Then, relevance scores are computed for the query with respect to individual profiles. The relevance scores may be computed as a sum over the selected features of factors indicative of uniqueness and frequency of the selected features relative to the individual profiles (block 504). In general, any suitable computation can be employed to score profiles one to another based on a relevance measure and rank profiles one to another accordingly. In at least some implementations, the relevance score computation is configured to account for uniqueness and frequency of the selected features relative to the individual profiles. In one approach, relevance is assessed using an information retrieval model that is adapted for visitor identification techniques.

In an information retrieval model, there is a user query and a ranked list of relevant documents retrieved from the document corpus based on the user query. The documents' relevance to the query is computed by the following relevance score formula:

$$\text{score}(\text{query}, \text{document}) = s \Sigma_{term \in query} t f_{term, document} \times i d f_{term}$$

In the above formula, s is the normalization factor, tf is how frequently the term appears in the document, and idf is how unique the term is in the document corpus. A straight forward way to compute the score is to use the formula across all documents in the target corpus. In practice, however, information retrieval systems calculate scores across fewer documents using inverse document indexes to conserve time and computing resources. Inverse document indexes map terms to lists of documents that appear in.

Because of this, information retrieval systems only score non-zero documents, accumulated from these inverse document indexes. Limiting the set of documents that are searched by using inverse document indexes conserves time and resources and make the system work efficiently and effectively.

As noted, visitor identification techniques discussed herein utilize an information retrieval model that is adapted to work for profile matching. Instead of a typed query, clickstream data and corresponding hits are used to drive the analysis. Instead of searching a corpus of documents, the matching is conducted with a corpus of profiles that reflect clickstream histories. The terms of query are replaced by feature values for selected features. Additionally, the profile database 206 can organize profiles 208 using inverted indexes keyed by feature values to facilitate fast searching. In this context, the relevance score for hit/clickstream to a profile can be expressed as follows:

$$\text{score}(\text{hit}, \text{profile}) = s\Sigma_{feature \in hit} tf_{feature, profile} \times idf_{feature}$$

The top result (profile/document) for a query (hit) is the most similar profile as assessed by the relevance score in the information retrieval model. This top ranking profile is most likely to correspond to same user/device from which the clickstream data was obtained.

Using the above model, clickstream data is transformed into a query. For example, a hit can contain following information "111.222.333.44, English, US, 95113 . . . ," which correspond to IP address, language, country, and zip code. Each feature value is used as a parameter for matching analysis. Clickstream data that is associated with known identifiers (e.g. data and hit for logged-in users) is grouped together to form profiles 208 as noted previously.

When a new interaction by an anonymous, unknown visitor occurs, a query is generated from the clickstream data and used in accordance with the information retrieval model to determine whether the interaction matches an existing profile or not. The relevance decision is made by computing the relevance score, which reflects how unique the feature value (term) is among all the visitors (idf) and how frequently the feature value appears in a visitor profiles (tf) being scored for possible matching.

Having determined relevance scores, relevance of profiles to the query are ranked according to the relevance scores (block 506). Then, a top ranking profile can be identified. In one or more implementation, a threshold score is established to ensure that sufficient closeness exists between the top ranking profile and input clickstream data before combining the data with the profile. Otherwise, all new data would be forced into one of the profiles, which would lead to inaccuracies when relevance scores are low. As mentioned, the threshold score can be established by a developer. Optionally, the threshold score may be made adjustable by an end user to tune the system for different scenarios and objectives.

Accordingly, a determination is made regarding whether a threshold score is achieved (block 510). When the threshold score is achieved clickstream data is merged with top ranking profile (block 512). On the other hand, when the threshold score is not achieved, a new profile is created for the clickstream data. The new profile may be assigned an unmatched ID 210, such as a SGUID discussed previously. As more information is collected for the new profile it may be possible to determine through subsequent analysis that the new profile does match a different profile, in which case merging of the data is initiated. Alternatively, collection of sufficient data (e.g., multiple clickstream instances) in the new profile may indicate that the profile really does belong as a separate profile, at which time the new profile is treated as a profile for a known user.

Having considered the foregoing example details, consider now a discussion of an example system and devices that may be employed for aspects of visitor identification techniques in one or more implementations.

Example System and Devices

Figure 6:
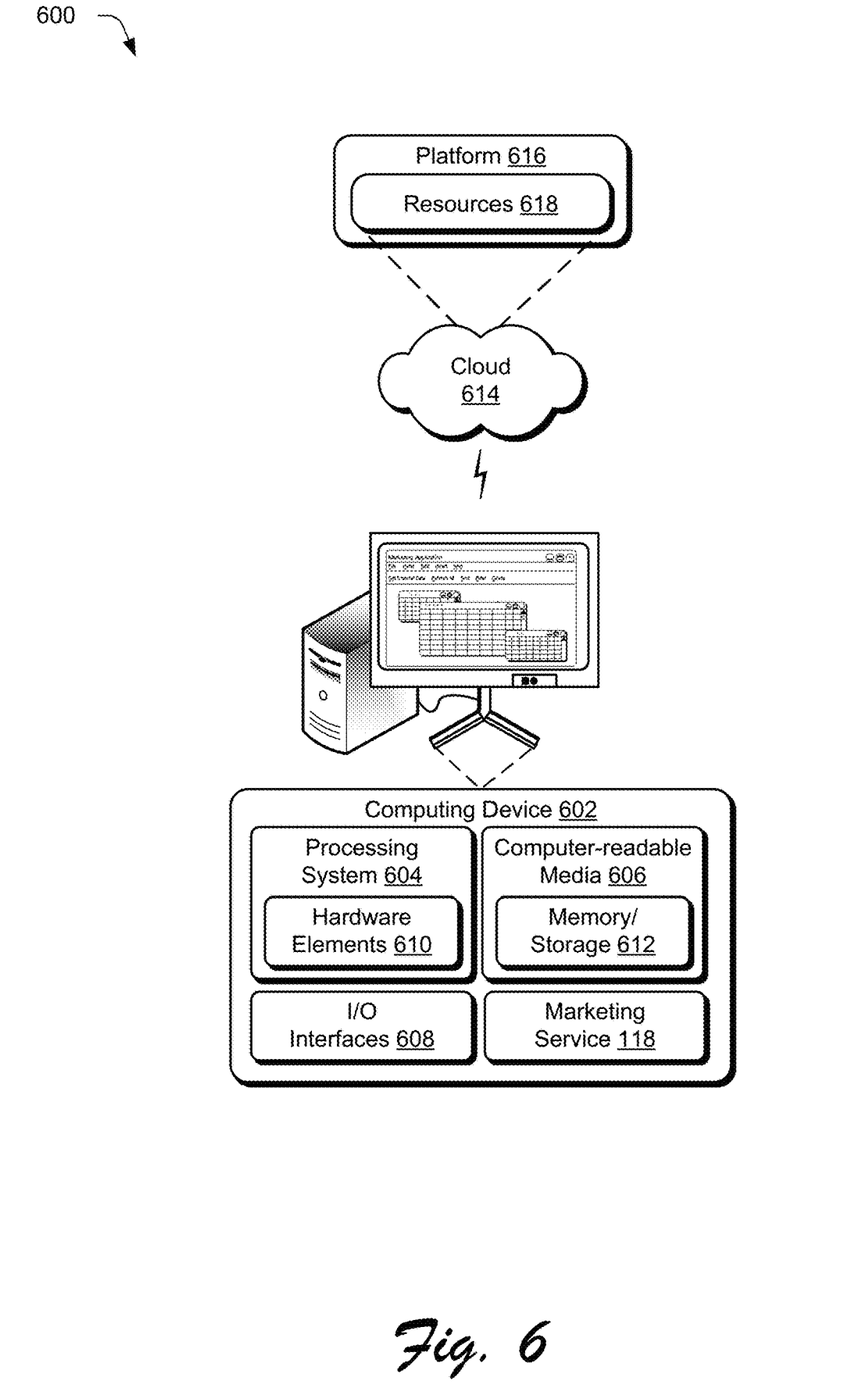
FIG. 6 illustrates an example system, devices, and components that can be employed to implement aspects of the techniques described herein.

FIG. 6 illustrates an example system generally at 600 that includes an example computing device 602 that is representative of one or more computing systems and/or devices that may implement the various techniques described herein. This is illustrated through inclusion of the marketing service 118, which may be configured to provide a suite of digital marketing tools to users of the service. Alternatively, the computing device may represent a client device that includes a marketing module 114 or browser 116 to implement aspects of the described techniques. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although aspects have been described herein in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. In a digital media content delivery environment, a method comprising:

collecting, by at least one computing device, clickstream data via a network, the clickstream data collected for an unknown visitor involved with online user interaction with digital media content;

selecting, by at least one computing device, features to use for matching of the clickstream data collected for the unknown visitor to a profile of a plurality of profiles, maintained in a computer-readable storage medium, established for known visitor identifiers (IDs), the selecting including:

determining an extent to which a respective said feature occurs in each instance of clickstream data of an individual said profile as a measure of completeness;

determining an extent to which the respective said feature has a same value across different instances of clickstream data of the individual said profile as a measure of consistency; or determining an extent to which the respective said feature does not occur in any other said profile other than the individual said profile as a measure of uniqueness;

computing, by the at least one computing device, relevance scores of the clickstream data for the unknown visitor relative to the plurality of profiles over the selected features using an information retrieval model;

matching, by the at least one computing device, the unknown visitor to a respective said profile based on the relevance scores; and initiating, by the at least one computing device, communication of digital media content to the unknown visitor based on analysis of the clickstream data contained in the respective said profile.

2. The method as described in claim 1, wherein selecting features comprises generating a list of features ranked by predictability scores derived from feature selection analysis, the list of features employed in analysis to match visitor data for the unknown visitor to respective ones of the plurality of profiles corresponding to the known visitor IDs.

3. The method as described in claim 2, wherein generating the list of features comprises: collecting the clickstream data indicative of the interactions of consumers with the digital media content; grouping the collected clickstream data by the known visitor identifiers (IDs) in the profiles maintained for the known visitor IDs; and computing the relevance scores for features included in the collected clickstream data by combining factors for completeness, consistency, and uniqueness of the features among the profiles.

4. The method as described in claim 2, wherein matching includes: for the clickstream data corresponding to the unknown visitor, transforming the clickstream data into a query for an information retrieval model;

computing relevance scores for the query with respect to individual profiles of the plurality of profiles as a sum over the selected features of factors indicative of uniqueness and frequency of the selected features relative to the individual profiles;

and ranking relevance of the plurality of profiles, respectively to the query according to the relevance scores.

5. The method as described in claim 4, wherein matching includes:

merging the clickstream data corresponding to the unknown visitor with a top ranking profile when a threshold relevance score is achieved; or creating a new profile for the clickstream data corresponding to the unknown visitor when the threshold relevance score is not achieved.

6. The method as described in claim 1, wherein the digital media content includes at least one of content recommendations, marketing offers, individualized digital media content, or advertisements.

7. The method as described in claim 1, wherein initiating communication of digital media content comprises performing one or more marketing actions to provide targeted digital media content directly to the unknown visitor.

8. The method as described in claim 1, wherein initiating communication of digital media content comprises sending one or more control messages to a marketing device associated with a marketer effective to cause performance of one or more marketing actions to provide targeted digital media content to the unknown visitor.

9. The method as described in claim 1, wherein the matching includes searching a visitor profile database using values for the selected features, the visitor profile database configured to use inverted indexes that map feature values to profiles containing the values to facilitate fast searching.

10. The method as described in claim 1, wherein the method is performed by a marketing service made accessible to digital marketers and consumers over a network via a service provider.

11. In a digital media environment for delivery of digital media content to consumers, a method to identify consumers corresponding to visitor interactions with resources available from a service provider comprising:

collecting, by at least one computing device, clickstream data via a network, the clickstream data collected for an unknown visitor involved with online user interaction with digital media content;

selecting, by the at least one computing device, features to use for matching of the clickstream data collected for the unknown visitor to a profile of a plurality of profiles that reflect clickstream histories established for known visitor identifiers (IDs), the selecting including:

determining whether a respective said feature occurs in each data instance of a respective said profile as a measure of completeness;

determining an extent to which the respective said feature has a same value in the respective said profile as a measure of consistency; or determining whether the respective said feature occurs in another said profile as a measure of uniqueness;

computing, by the at least one computing device, relevance scores of the clickstream data for the unknown visitor relative to the plurality of profiles over the selected features using an information retrieval model;

matching, by the at least one computing device, the unknown visitor to a respective said profile based on the relevance scores; and communicating a control message to cause communication of digital media content to the unknown visitor based on the respective said profile.

12. The method as described in claim 11, wherein the selecting includes generating a list of features ranked by relevance scores derived from feature selection analysis, the list of features employed in analysis to match visitor data for unknown visitors to the profiles corresponding to the known visitor IDs.

13. The method as described in claim 12, wherein generating the list of features comprises: collecting the clickstream data indicative of the interactions of consumers with the digital media content; grouping the collected clickstream data by the known visitor identifiers (IDs) in the profiles maintained for the known visitor IDs; and computing the relevance scores for features included in the collected clickstream data by combining factors for completeness, consistency, and uniqueness of the features among the profiles.

14. The method as described in claim 12, wherein matching the consumers to the plurality of profiles comprises: for clickstream data corresponding to an unknown visitor, transforming the clickstream data into a query for the information retrieval model; computing relevance scores for the query with respect to individual profiles of the plurality of profiles as a sum over the selected features of factors indicative of uniqueness and frequency of the selected features relative to the individual profiles; and ranking relevance of respective said profiles to the query according to the relevance scores.

15. The method as described in claim 14, wherein matching further comprises:
   merging the clickstream data corresponding to the unknown visitor with a top ranking profile when a threshold relevance score is achieved; or
   creating a new profile for the clickstream data corresponding to the unknown visitor when the threshold relevance score is not achieved.

16. The method as described in claim 11, wherein the digital media content includes at least one of content recommendations, marketing offers, individualized digital media content, or advertisements.

17. The method as described in claim 11, wherein initiating communication of digital media content comprises performing one or more marketing actions to provide targeted digital media content directly to the unknown visitor.

18. The method as described in claim 11, wherein initiating communication of digital media content comprises sending one or more control messages to a marketing device associated with a marketer effective to cause performance of one or more marketing actions to provide targeted digital media content to the unknown visitor.

19. The method as described in claim 11, wherein the matching includes searching a visitor profile database using values for the selected features, the visitor profile database configured to use inverted indexes that map feature values to profiles containing the values to facilitate fast searching.

20. In a digital media content environment for delivery of digital media content to consumers, a system comprising:
   means for collecting clickstream data via a network, the clickstream data collected for an unknown visitor involved with online user interaction with digital media content, the unknown visitor unable to access to particular digital media content, the particular digital media content comprising first digital media content and second digital media content;
   means for selecting features to use for matching of the clickstream data collected for the unknown visitors to a profile of a plurality of profiles that reflect clickstream histories established for known visitor identifiers (IDs), the selecting including:
      means for determining whether a respective said feature occurs in each data instance of a respective said profile as a measure of completeness;
      means for determining an extent to which the respective said feature has a same value in the respective said profile as a measure of consistency;
   or
      means for determining whether the respective said feature occurs in another said profile as a measure of uniqueness;
   means for computing relevance scores of the clickstream data for the unknown visitor relative to the plurality of profiles over the selected features using an information retrieval model;
   means for matching unknown visitors to a respective said profile based on the relevance scores; and
   means for controlling access, the controlling means enabling access to the particular digital media content by the unknown visitor based on the respective said profile.

* * * * *